US012385754B2

(12) United States Patent
Dagley et al.

(10) Patent No.: US 12,385,754 B2
(45) Date of Patent: Aug. 12, 2025

(54) GENERATING A TEST DRIVE ROUTE

(71) Applicant: Capital One Services, LLC, McLean, VA (US)

(72) Inventors: Geoffrey Dagley, McKinney, TX (US); Qiaochu Tang, Frisco, TX (US); Micah Price, The Colony, TX (US); Avid Ghamsari, Carrollton, TX (US)

(73) Assignee: Capital One Services, LLC, McLean, VA (US)

( * ) Notice: Subject to any disclaimer, the term of this patent is extended or adjusted under 35 U.S.C. 154(b) by 90 days.

(21) Appl. No.: 17/645,585

(22) Filed: Dec. 22, 2021

(65) Prior Publication Data

US 2023/0194291 A1 Jun. 22, 2023

(51) Int. Cl.
*G01C 21/36* (2006.01)
*G01C 21/34* (2006.01)

(52) U.S. Cl.
CPC ..... *G01C 21/3626* (2013.01); *G01C 21/3469* (2013.01); *G01C 21/3492* (2013.01); *G01C 21/3694* (2013.01)

(58) Field of Classification Search
CPC ............ G01C 21/3626; G01C 21/3469; G01C 21/3492; G01C 21/3694
See application file for complete search history.

(56) References Cited

U.S. PATENT DOCUMENTS

| | | | | |
|---|---|---|---|---|
| 2006/0129313 A1* | 6/2006 | Becker | ............ | G08G 1/096844 340/995.19 |
| 2006/0149461 A1* | 7/2006 | Rowley | ............ | G08G 1/096883 701/423 |
| 2011/0184642 A1* | 7/2011 | Rotz | .................. | G01C 21/3469 701/533 |
| 2011/0295986 A1* | 12/2011 | Ferris | ..................... | H04L 67/10 709/222 |
| 2017/0330111 A1* | 11/2017 | Vogel | ..................... | G06Q 50/40 |
| 2018/0201273 A1* | 7/2018 | Xiao | ............... | B60W 30/18163 |
| 2020/0189601 A1* | 6/2020 | Grober | ................. | B60W 40/06 |
| 2022/0318759 A1* | 10/2022 | Tarchala | ............... | G06F 16/903 |

FOREIGN PATENT DOCUMENTS

JP 2005044057 * 2/2005
KR 20210069177 * 6/2021

* cited by examiner

*Primary Examiner* — Joan T Goodbody
*Assistant Examiner* — Godfrey Aleksander Maciorowski
(74) *Attorney, Agent, or Firm* — Harrity & Harrity, LLP

(57) ABSTRACT

In some implementations, a system may receive driving data representative of a driving pattern of a user. The system may identify a third party entity to facilitate a test drive by the user. The system may identify a geographic area within a threshold proximity of a location of the third party entity. The system may identify a plurality of waypoints within the geographic area, wherein one or more of the waypoints or one or more route segments defined by the waypoints satisfy one or more conditions based on the driving data. The system may obtain the test drive route starting and ending at the location of the third party entity and including the waypoints. The system may transmit data indicating the test drive route to at least one of a user device, an on-board computer of a test drive vehicle, or a third party device of the third party entity.

20 Claims, 8 Drawing Sheets

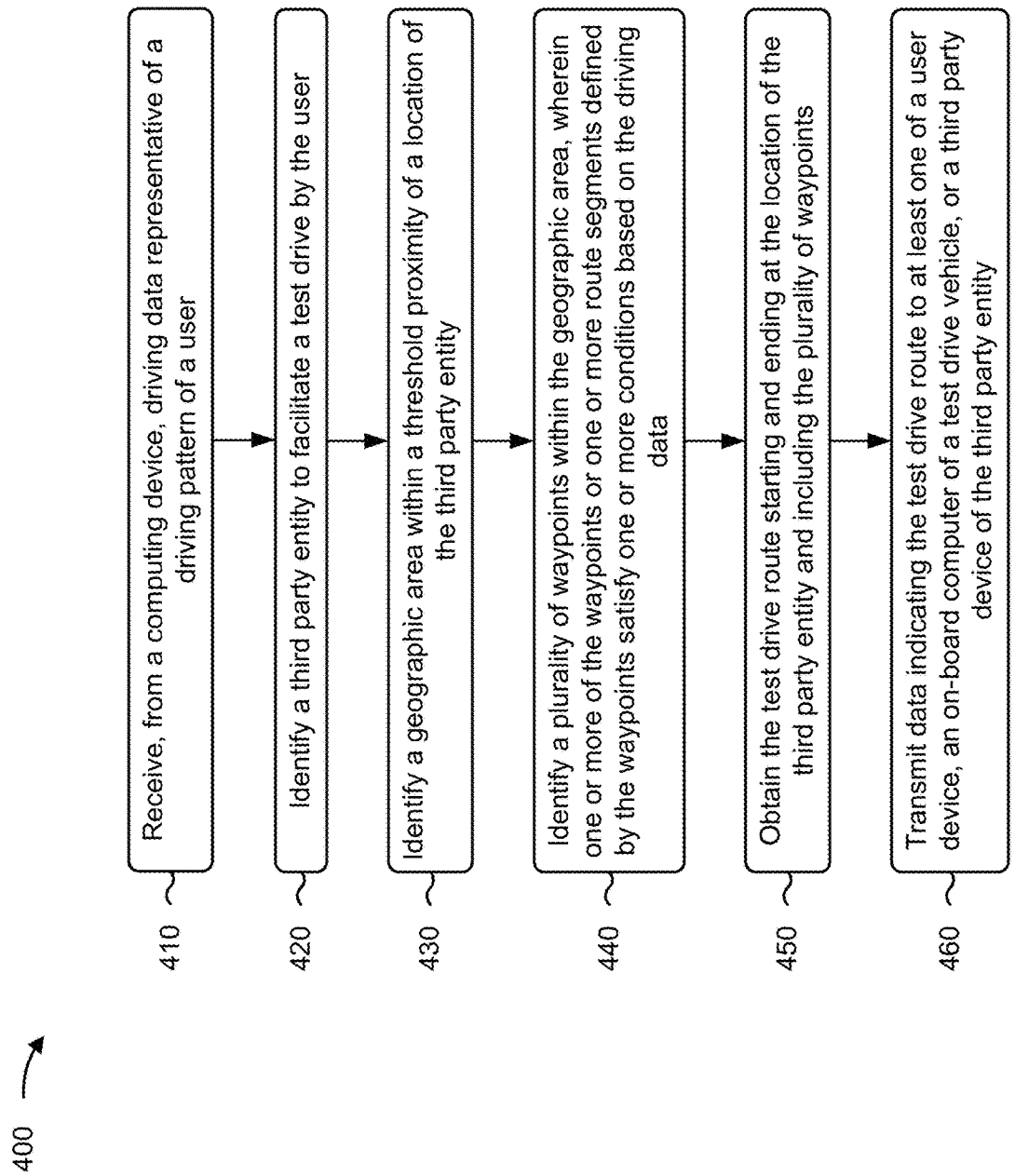

GENERATING A TEST DRIVE ROUTE

BACKGROUND

A vehicle experience may provide an individual, such as a driver, access to a vehicle for a period of time to permit the individual to review the vehicle. For example, prior to leasing or purchasing a vehicle, an individual may have access to the vehicle, via a test drive, to review the vehicle and/or confirm whether the vehicle satisfies the individual's expectations.

SUMMARY

Some implementations described herein relate to a system for generating a test drive route. The system may include one or more memories and one or more processors communicatively coupled to the one or more memories. The one or more processors may be configured to receive, from a computing device, driving data representative of a driving pattern of a user, wherein the driving data indicates at least one of: a portion of a route of a vehicle associated with the user during operation of the vehicle by the user, a performance measurement of the vehicle during operation of the vehicle by the user, a driving style of the user, a drive type of the portion of the route of the vehicle, or a road feature along the portion of the route of the vehicle during operation of the vehicle by the user. The one or more processors may be configured to identify a third party entity to facilitate a test drive by the user. The one or more processors may be configured to identify a geographic area within a threshold proximity of a location of the third party entity. The one or more processors may be configured to identify a plurality of waypoints within the geographic area, wherein one or more of the waypoints or one or more route segments defined by the waypoints satisfy one or more conditions based on the driving data. The one or more processors may be configured to obtain the test drive route starting and ending at the location of the third party entity and including the plurality of waypoints. The one or more processors may be configured to transmit data indicating the test drive route to at least one of a user device, an on-board computer of a test drive vehicle, or a third party device of the third party entity.

Some implementations described herein relate to a method of generating a test drive route. The method may include receiving, by a system and from a computing device, driving data corresponding to a driving pattern of a user. The method may include identifying, by the system, a driver archetype based on the driving pattern of the user. The method may include identifying, by the system, one or more conditions associated with the driver archetype. The method may include identifying, by the system, a third party entity to facilitate a test drive by the user, wherein the third party entity has a location within a geographic area associated with the user. The method may include identifying, by the system, a plurality of waypoints within a threshold distance from the location of the third party entity, wherein the plurality of waypoints or one or more route segments defined by the plurality of waypoints satisfy a threshold number of the one or more conditions. The method may include obtaining, by the system, the test drive route starting and ending at the location of the third party entity and including the plurality of waypoints. The method may include outputting, by the system, data indicating the test drive route.

Some implementations described herein relate to a non-transitory computer-readable medium that stores a set of instructions for a device. The set of instructions, when executed by one or more processors of the device, may cause the device to receive driving data from a computing device, wherein the driving data corresponds to a driving pattern of a user. The set of instructions, when executed by one or more processors of the device, may cause the device to identify a third party entity to facilitate a test drive by the user. The set of instructions, when executed by one or more processors of the device, may cause the device to identify a geographic area within a threshold proximity of a location of the third party entity. The set of instructions, when executed by one or more processors of the device, may cause the device to identify one or more waypoints within the geographic area, wherein the one or more waypoints or one or more route segments defined by the one or more waypoints satisfy one or more conditions based on the driving data. The set of instructions, when executed by one or more processors of the device, may cause the device to transmit, to a navigation system, data corresponding to the location of the third party entity, as a start point of a test drive route and as an end point of the test drive route, and the one or more waypoints as one or more intermediate locations between the start point and the end point of the test drive route. The set of instructions, when executed by one or more processors of the device, may cause the device to receive, from the navigation system, the test drive route based on transmitting the data corresponding to the location of the third party entity and the one or more waypoints. The set of instructions, when executed by one or more processors of the device, may cause the device to transmit, to at least one of a user device, an on-board computer of a test drive vehicle, or a third party device of the third party entity, data indicating the test drive route.

BRIEF DESCRIPTION OF THE DRAWINGS

FIG. 4 is a flowchart of an example process relating to generating a test drive route.

DETAILED DESCRIPTION

Figure 1A:
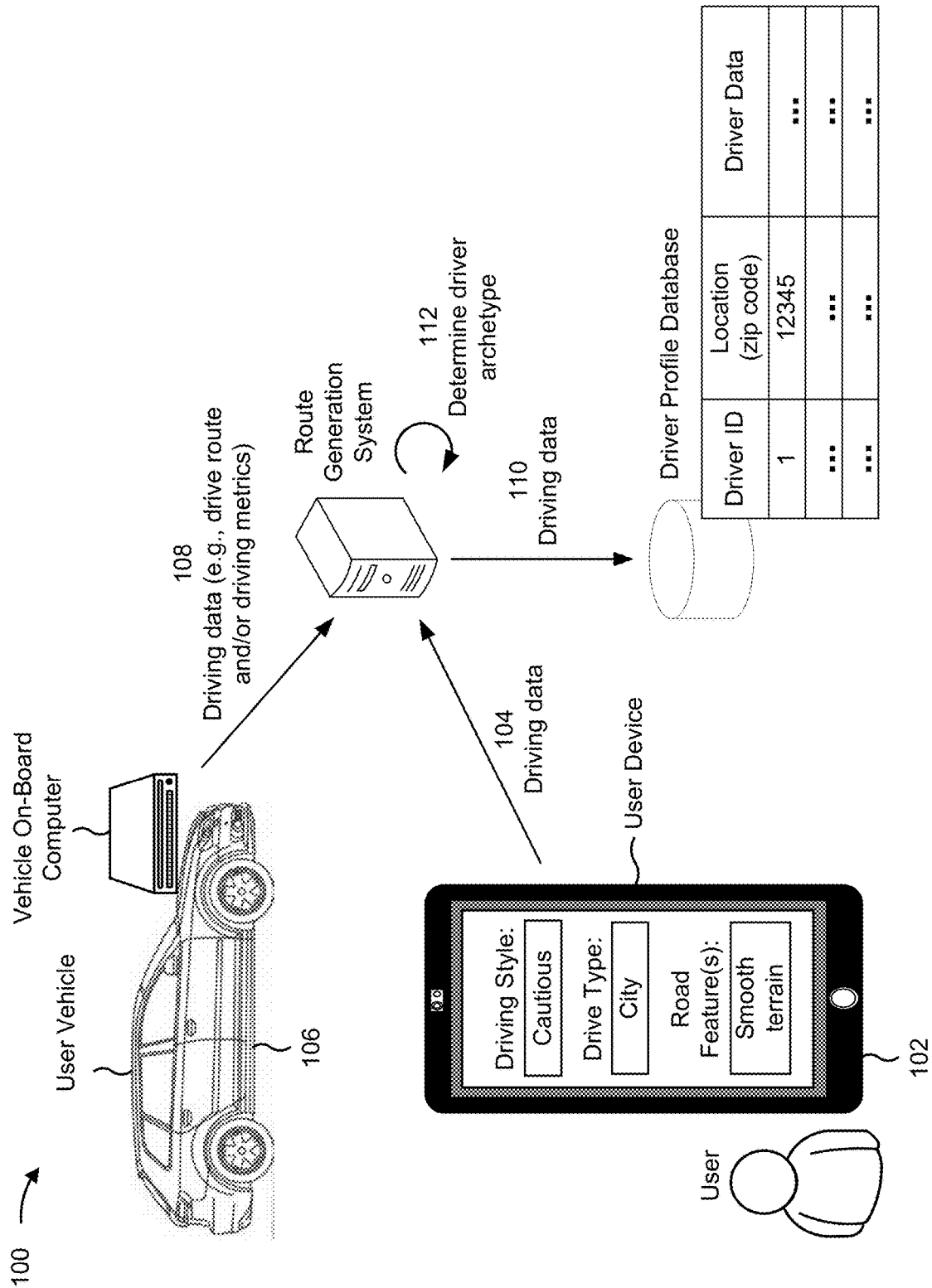
FIGS. 1A-1E are diagrams of an example implementation relating to generating a test drive route.

The following detailed description of example implementations refers to the accompanying drawings. The same reference numbers in different drawings may identify the same or similar elements.

A test drive typically involves an individual requesting a seller (e.g., an individual or organization, such as a manufacturer, dealer, or other entity that sells vehicles) to allow the individual to drive a vehicle for a period of time and accessing the vehicle from a location of the seller. For example, a consumer may arrive at a dealership and request the dealership to authorize the test drive. Oftentimes, an agent of the dealership has a set route to have the consumer drive the test drive vehicle. The set route is the same across all consumers. Other times, the dealership allows the consumer to take the test drive vehicle on the consumer's own. However, the consumer may be unfamiliar with the area and/or to what extent the consumer may test drive the vehicle.

Some implementations described herein provide a system that generates a test drive route tailored to a particular consumer's typical operation of the vehicle associated with the consumer (e.g., user). The system generates such tailored test drive routes based on the consumer's driving pattern (e.g., the driving behavior of the consumer, typical driving conditions experienced by the consumer, etc.). The system may obtain driving data representative of the driving pattern of the consumer from different sources (e.g., direct input from the consumer and/or monitoring and measuring actual driver performance). The system may also identify a third party entity (e.g., a dealership) to facilitate the test drive. From the driving data and information related to the third party entity (e.g., a location of the third party entity), the system may identify multiple waypoints within a geographic area of the location of the third party entity that satisfy one or more conditions related to the driving data. The waypoints and/or one or more route segments defined by the waypoints may satisfy one or more conditions based on the driving data. The system may then obtain (e.g., generate or receive from a third party navigation system) the test drive route starting and ending at the location of the third party entity and including the waypoints as intermediate locations.

In some implementations described herein, the system may categorize the consumer's driving pattern with a driver archetype (e.g., "Cautious," "Comfort," "Sporty," "City," "Highway," "Long Distance," "Commuter," etc.). From the driver archetype, the system may identify other drivers having a similar driver archetype, and further identify the conditions related to the driver archetype and/or associated with the other drivers (e.g., as stored in a database). The system may then use similar conditions to identify waypoints in the geographic area of the particular third party entity to generate the test drive route tailored to the consumer.

By using a driving pattern associated with a particular consumer to generate a test drive route, the system is capable of generating a test drive route that is representative of the intended operation of a vehicle by the consumer. Automatically generating routes by the system is more accurate and efficient than a person (e.g., the consumer or dealership agent) creating custom routes for each test drive based on preferences of the particular consumer. Additionally, because of the accuracy of the test drive routes in representing the consumer's intended operation of the vehicle, wear and tear on the test drive vehicle may be reduced. Moreover, incorporating waypoints into a particular drive route may be less computationally and logistically complex than determining routes for separate trips, and therefore may conserve computing resources (e.g., memory resources, processing resources, and/or battery power) of the system, may reduce wear and tear on a vehicle used for the test drive, and may conserve energy needed to fuel the vehicle. In addition, the system being able to automatically update the test drive route while the test drive is in progress provides greater safety than the consumer, who may not be familiar with the geographic area, modifying the route to try and find conditions more representative of the consumer's typical drive and intended operation of the vehicle. Furthermore, by associating similar driving patterns of drivers, the system is able to efficiently generate and provide a test drive route for a particular consumer.

FIGS. 1A-1E are diagrams of an example 100 associated with generating a test drive route. As shown in FIGS. 1A-1E, example 100 includes a route generation system, a driver profile database, a user device, a vehicle on-board computer, a navigation system, a third party entity database, a third party device, and an add-on database. These devices are described in more detail in connection with FIGS. 2 and 3.

As shown in FIG. 1A, the route generation system may collect driving data for a user (e.g., a driver for whom the test drive is to be generated). The driving data may be representative of a driving pattern associated with the user, such as the driving behavior of the user, typical driving conditions experienced by the user, etc. For example, the driving data may indicate a route of a vehicle (e.g., a drive route) or a portion of a drive route associated with the user during operation of the vehicle by the user. Additionally, or alternatively, the driving data may indicate a performance measurement of the vehicle during operation of the vehicle by the user (e.g., vehicle driving metrics). Additionally, or alternatively, the driving data may indicate a driving style of the user (e.g., a cautious driver, a sporty driver, a comfort driver, etc.). Additionally, or alternatively, the driving data may indicate a drive type of a typical drive route of the vehicle during operation of the vehicle by the user (e.g., a type of drive typically experienced by the user, such as city driving, highway driving, stop-and-go driving, residential driving, commercial driving, etc.). Additionally, or alternatively, the driving data may indicate a road feature along a typical drive route of the vehicle during operation of the vehicle by the user (e.g., features in the road and/or drive route, such as rough terrain, potholes, unpaved roads, smooth terrain, curves, etc.).

In some implementations, the route generation system may receive the driving data via active input from the user (e.g., via a mobile application installed on and executed from a user device or via a web-based application accessed by the user device over a network). For example, as shown by reference number 102, the user device may display a series of queries for information related to the user's driving pattern. The information may include the user's driving style (e.g., a cautious driving style), a drive type (e.g., city driving), and/or road features (e.g., smooth terrain). The user may manually input the information into dedicated entry fields presented on a display of the user device (e.g., via a physical keyboard, a virtual keyboard, or a voice entry). Additionally, or alternatively, the user may select a preset option from a plurality of options for one or more of the queries (e.g., via a drop-down list) populated on the display of the user device. As shown by reference number 104, the route generation system may receive the driving data from the user device (e.g., over a network, as described in more detail below).

In some implementations, the route generation system may receive the driving data via passive input from the user. For example, as shown by reference number 106, the user's driving pattern may be monitored by an on-board computer of a vehicle of the user. The on-board computer may include or communicate with a vehicle navigation system that may track and/or measure actual driving metrics of the vehicle. For example, the vehicle navigation system may include one or more sensors and/or devices configured to detect and/or measure the actual driving metrics (e.g., a speed of the vehicle, an acceleration of the vehicle from a standstill position of the vehicle, a deceleration of the vehicle to a standstill position of the vehicle, a vertical displacement of a body of the vehicle, centripetal force, centrifugal force, or the like). Additionally, or alternatively, the on-board computer and/or the vehicle navigation system may be able to track and/or determine other performance measurements, such as a number of times the vehicle is in the standstill position within a set period of time or a number of turns the vehicle makes within the set period of time. Additionally, or alternatively, the vehicle navigation system may include a global navigation system (GNSS) device (e.g., a Global Positioning System (GPS) device) configured to track a drive route of the vehicle. Additionally, or alternatively, the vehicle performance measurements may be measured and/or determined via the user device (e.g., mobile phone) while the user is operating the vehicle. Utilizing data from actual driving allows the route generation system to have an accurate representation of the user's driving pattern because the data indicates the way the user actually would use a vehicle in which the user is interested in test driving and purchasing.

As shown by reference number 108, the route generation system may receive, from the vehicle on-board computer (and/or from the user device), data corresponding to the vehicle performance measurements. For example, the vehicle on-board computer may transmit the data after a particular route is completed (e.g., after the user has turned the ignition off or the vehicle has been at a standstill for a set duration) and/or based on user input (e.g., the user selects an option presented on a display of the vehicle on-board computer to submit the data or a subset of the data to the route generation system). Alternatively, the vehicle on-board computer may transmit the data in real-time as the route is in progress (e.g., transmit blocks of data in set intervals of time). Additionally, or alternatively, the user device may similarly transmit data after the route is completed, based on user input, or in real-time when the route is in progress.

As shown by reference number 110, the route generation system may store the driving data in a driver profile database under an account of the user. The user's account may be associated with a driver identifier, which may uniquely identify the user.

In some instances, the user may operate the vehicle in different driving environments and/or under different driving conditions. For example, the user may operate the vehicle in a city setting during weekdays but then operate the vehicle in a rural setting over the weekend. To account for the differences, the route generation system may store the driving data associated with a particular drive route with data associated with a date and/or time of the drive route. Additionally, or alternatively, the route generation system may receive driving data for specific days and/or time of day (e.g., days and/or times most representative of the user's typical operation of the vehicle). Additionally, or alternatively, the route generation system may remove or not store driving data for a drive route that differs from the majority of (or a threshold amount of) the other driving data. For example, if the route generation system receives driving data that indicate a sporty driving style and/or highway driving for a threshold number of actual drive routes (e.g., 5), but then subsequently receives driving data indicating a cautious driver and/or city driving, then the route generation system may discard the subsequent driving data. Accordingly, when generating a test drive route (as described in more detail below), the route generation system may use the driving data that most closely represents the user's typical operation of the vehicle and most likely use of the vehicle that the user is test driving.

Additionally, or alternatively, in some implementations, the route generation system may obtain driving data from both sources (e.g., user input and vehicle performance measurements) for a particular user. In some instances, the information input by the driver may be inconsistent with the vehicle performance measurements determined during operation of the vehicle. For example, the user may input a city driving drive type, but the vehicle performance measurements may indicate a highway driving drive type (e.g., a maximum speed exceeding 70 mph). In such instances, the route generation system may store the driving data indicating the vehicle performance measurements and discard the driving data indicating the user input because the vehicle performance measurements more accurately represent the user's most likely operation of the vehicle. Alternatively, the route generation system may store the driving data indicating the user input and discard the driving data indicating the vehicle performance measurements because the user input is a more accurate representation of the user's desires. Alternatively, the route generation system may notify the user (e.g., via a notification to the user device) that there is an inconsistency in driving data, and prompt the user to select which driving data to associate with the user in the driver profile database. Additionally, or alternatively, the system may apply different weights to the driving data from the different sources (e.g., a stronger weight may be applied to the driving data indicating the vehicle performance measurements). For example, if the user input indicates a drive type of city, but the vehicle performance measurements indicate highway driving (e.g., the vehicle speed exceeds a threshold value), then the route generation system may store a drive type that includes a higher percentage of highway driving (e.g., as determined by the weight) and a remaining percentage of city driving. The route generation system may then apply a similar ratio when determining the test drive route.

In some implementations, as shown by reference number 112, the route generation system may determine one or more driver archetypes of the user based on the driving data associated with the user's account. The driver archetype is a categorization of the driver's driving pattern, and may include, but is not limited to, "Cautious," "Comfort," "Sporty," "City," "Highway," "Long Distance," "Commuter," etc. In some instances, the driver archetype may be the same as the driving style or the drive type input by the user. In other instances, the route generation system may determine the driver archetype based on one or more rules related to the vehicle performance measurements. For example, if the vehicle performance measurements indicate a vehicle speed above a threshold value (e.g., 65 mph), such as for a threshold amount of time and/or above threshold ratio or percentage of drive time, then the route generation system may assign a "Highway" driver archetype. As another example, if the vehicle performance measurements indicate that the user does not exceed a speed limit by a threshold amount (e.g., 5 mph or less), then the route generation system may assign a "Cautious" driver archetype. As another example, if the vehicle performance measurements indicate a number of times the vehicle is at a standstill exceeds a threshold number (e.g., 3 times) within a set amount of time (e.g., 10 minutes), then the route generation system may assign a "City" driver archetype. The driver archetype may be stored with the driver profile in the driver profile database and associated with the driver identifier.

Figure 1B:
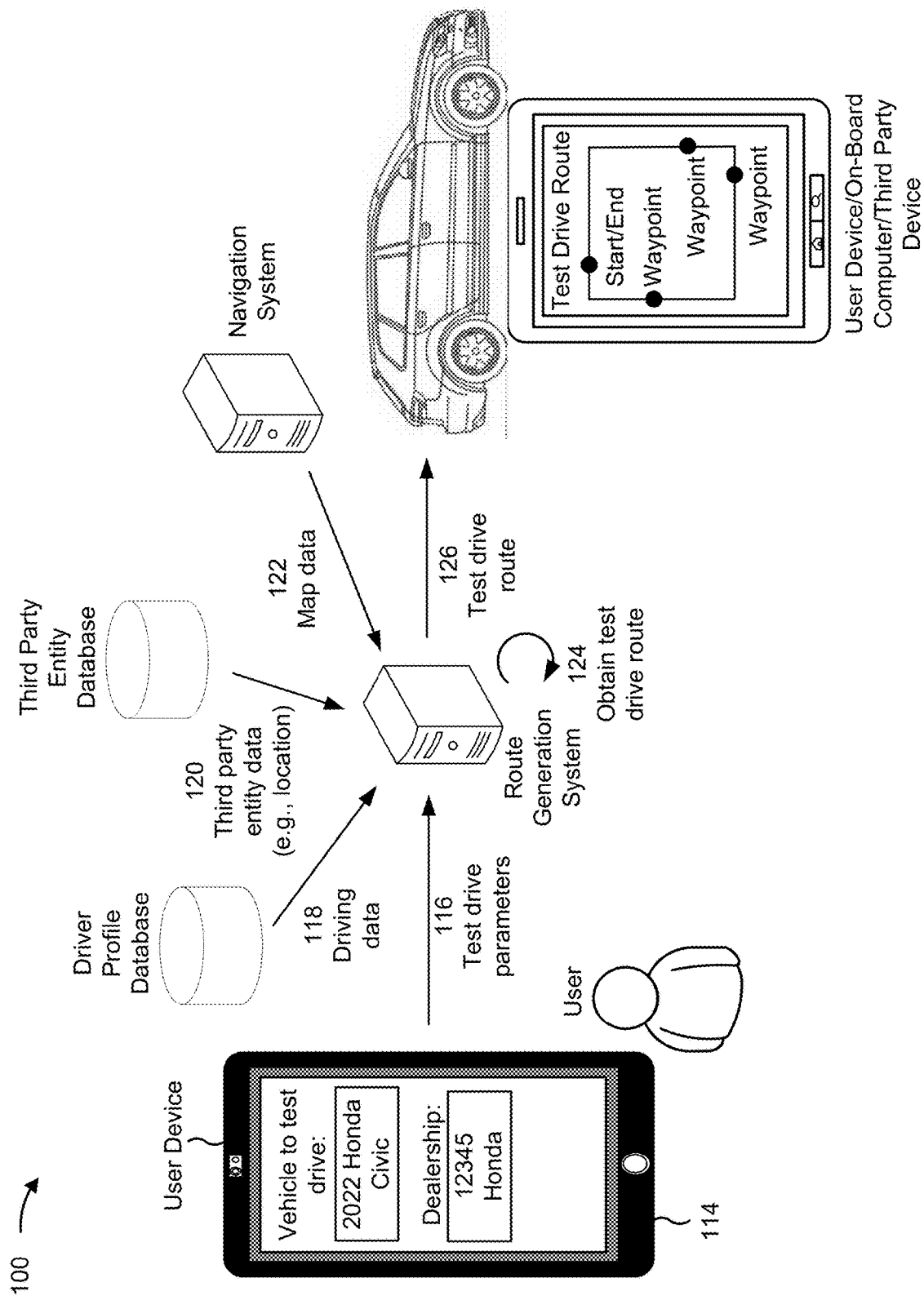

As shown in FIG. 1B, the user may initiate a request for a test drive. For example, as shown by reference number 114, the user may provide (e.g., via the user device) test drive parameters, such as the particular vehicle (e.g., make, model, and/or year) the user is interested in test driving (e.g., the desired test drive vehicle) and/or a particular third party entity (e.g., dealership) to facilitate the test drive. The user may manually input the information in dedicated entry fields presented on the display of the user device (e.g., via a physical keyboard, a virtual keyboard, or a voice entry). Alternatively, the user may select one or more preset options from a plurality of options for the make, model, and/or year (e.g., via one or more drop-down lists). Additionally, or alternatively, the route generation system may identify one or more third party entities (e.g., from a third party entity database) having a location within a threshold distance (e.g., 10 miles, 25 miles, 50 miles, etc.) from the user (e.g., the location of the user device or the address of the user) and that has the desired test drive vehicle in the third party entity's inventory. The user may select the threshold distance (e.g., in response to a prompt on the user device), or a default threshold distance may be used. The route generation system may transmit data indicating the identified third party entities to the user device, which may populate the identified third party entities for the user to select one (e.g., in a drop down-list). As shown by reference number 116, the route generation system may receive the test drive parameters from the user device.

In addition to the test drive parameters, the route generation system may further receive, from the user device, the user's driver identifier associated with the user's account. The driver identifier may automatically be associated with the user's test drive request, for example, by way of the user logging into the user's account (e.g., via the application) to initiate the request. Alternatively, the user may manually input the driver identifier, for example, before, after, or at the same time as the test drive parameters. As shown by reference number 118, from the driver identifier, the route generation system may access the user's account and obtain data indicating the user's geographic location (e.g., address, zip code, and/or geographic coordinates) and the driving data associated with the user, including the driver archetype assigned to the user based on the driving data.

As shown by reference number 120, based on the user input or selection of a particular third party entity, the route generation system may obtain third party data of the third party entity, including data indicating the third party entity's geographic location (e.g., address, zip code, and/or geographic coordinates), from the third party entity database. As shown by reference number 122, the route generation system may obtain map data corresponding to a region near or around the geographic location of the third party entity. For example, the route generation system may be in communication with and/or integrated with a navigation system or source that has a database of map data. The navigation system may be hosted and/or operated by the route generation system or by a third party, such as a third party navigation application. The route generation system may transmit, to the navigation system, the geographic location of the third party entity, and, in return, receive the map data corresponding to the region near or around the geographic location of the third party entity. From the map data, the route generation system may identify a geographic area within a threshold proximity (e.g., a distance of 5 miles, 10 miles, etc.) of the geographic location of the third party entity.

The route generation system may identify a plurality of physical locations (e.g., waypoints) within the geographic area. The route generation system may identify the physical locations as waypoints if one or more of the physical locations satisfy a condition related to the drive route based on the driving data and/or driver archetype. Additionally, or alternatively, the route generation system may identify physical locations as waypoints if the physical locations form route segments (e.g., segments of a route between the physical locations) that satisfy a condition related to the drive route. Each driver archetype and/or type of information indicated by the driving data (e.g., driving style, drive type, road features, etc.) may be associated with one or more conditions.

For example, a driving style, drive type, and/or driver archetype of "City" may be associated with a specific speed limit, multiple stops (e.g., at stop signs and/or traffic lights), multiple turns, and/or varying degrees of traffic. As an example, the condition may be that the drive route includes a threshold number of traffic signals and/or stop signs within a threshold distance of each other. Additionally, or alternatively, the condition may be that the drive route includes a threshold number of turns. Additionally, or alternatively, the condition may be that the drive route has a speed limit at or below a threshold value (e.g., 45 mph) for a threshold percentage of the drive route (e.g., 75%, 90%, etc.) and/or for a threshold distance (e.g., 5 miles, 10 miles, etc.).

As another example, a driving style, drive type, and/or driver archetype of "Highway" may be associated with a specific road type and/or speed limit. For example, the condition may be that the drive route includes a roadway categorized or otherwise identified as a "highway" (e.g., in the map data). Additionally, or alternatively, the condition may be that the drive route includes a toll and/or a high-occupancy vehicle (HOV) lane. Additionally, or alternatively, the condition may be that the drive route has a speed limit at or above a threshold value (e.g., 65 mph).

As another example, driving styles, drive types, and/or driver archetypes of "Long Distance" and/or "Commuter" may have one or more of the same or similar conditions as "City" and/or "Highway" driving styles, drive types, and/or driver archetypes (e.g., a long distance drive and/or a commute to work may include both city driving and highway driving). For example, the condition may be that a threshold percentage (e.g., 25%, 50%, etc.) of the drive route includes a threshold number of traffic signals and/or stop signs (representative of a city driving portion of the drive route), and a threshold percentage of the drive route (e.g., 50%, 75%, etc.) includes a highway. Additionally, or alternatively, the condition may be that a threshold percentage of the drive route has a speed limit that is at or below a threshold value (e.g., 45 mph), and a threshold percentage of the drive route has a speed limit that is at or above a threshold value (e.g., 65 mph).

As another example, a driving style and/or a driver archetype of "Cautious" may be associated with a specific road type and/or speed limit. For example, the condition may be that the drive route includes a road segment extending in a same direction (e.g., a straight road) for a threshold distance (e.g., 2 miles). Additionally, or alternatively, the condition may be that the drive route has a speed limit at or below a threshold value (e.g., 45 mph).

As another example, a driving style and/or a driver archetype of "Sporty" may be associated with a specific road type, road feature, and/or speed limit. For example, the condition may be that the drive route includes a threshold number of road segments categorized or otherwise identified as curves within a threshold distance of each other (e.g., a winding road). Additionally, or alternatively, the condition may be that the drive route has a speed limit at or above a threshold value (e.g., 65 mph).

As another example, a driving style and/or a driver archetype of "Comfort" may be associated with a specific road type, road feature, and/or speed limit. For example, the condition may be that the drive route includes a road segment categorized or otherwise identified as a smooth road or as being paved within a threshold number of years (e.g., within the past 2 years). Additionally, or alternatively, the condition may be that the drive route has a speed limit satisfying a threshold value or range of values (e.g., greater than 25 mph, between 25 mph and 45 mph, less than 45 mph, etc.).

As another example, a drive type of stop-and-go driving may be associated with a specific road feature, speed limit, and/or amount of traffic. For example, the condition may be that the drive route includes a threshold number of traffic signals and/or stop signs. Additionally, or alternatively, the condition may be that the drive route has a speed limit at or below a threshold value (e.g., 45 mph). Additionally, or alternatively, the condition may be that the drive route includes traffic, where the speed of the traffic (e.g., as detected by the navigation system) satisfies a threshold value or range of values (e.g., between 5 mph and 20 mph) and/or is below the speed limit by a threshold amount.

As another example, a drive type of residential driving may be associated with a specific road feature, speed limit, and/or other landmarks. For example, the condition may be that the drive route includes a threshold number of traffic signals and/or stop signs. Additionally, or alternatively, the condition may be that the drive route has a speed limit that satisfies a threshold value or range of values (e.g., between 25 mph and 40 mph). Additionally, or alternatively, the condition may be that the drive route includes multiple physical locations that each has a residential address and/or designation (e.g., as identified from the map data and/or by the navigation system).

As another example, a drive type of commercial driving may be associated with a specific road feature, speed limit, and/or other landmarks. For example, the condition may be that a threshold percentage (e.g., 25%, 50%, etc.) of the drive route includes a threshold number of traffic signals (e.g., indicative of city driving), and a threshold percentage (e.g., 50%, 75%, etc.) includes a roadway categorized or otherwise identified as a highway. Additionally, or alternatively, the condition may be that a threshold percentage of the drive route has a speed limit that is at or below a threshold value (e.g., 45 mph), and a threshold percentage of the drive route has a speed limit that is at or above a threshold value (e.g., 65 mph). Additionally, or alternatively, the condition may be that the drive route includes multiple physical locations that each has a business address and/or designation (e.g., as identified from the map data and/or by the navigation system).

Additionally, or alternatively, there may be one or more conditions that the drive route includes one or more road features (e.g., as may be input by the user). For example, one condition may be that the drive route includes one or more construction zones and/or one or more hazardous road conditions (e.g., potholes, winding roads, narrow shoulders, or the like), as may be identified in the map data and/or by the navigation system. As another example, another condition may be that the drive route includes one or more topographical features (e.g., hills), which the prediction system may identify based on a change in elevation by a threshold amount between two physical locations. The prediction system may obtain the elevations from the map data. As another example, another condition may be that one or more roadways, in the drive route, extend in a specified direction for a threshold distance (e.g., 2 miles) and/or at a specific time of day. For example, the direction may be in the east at dusk or in the west during the morning to replicate a driving condition of the sun in the user's eyes.

In some implementations, data indicating the one or more conditions may be associated with a corresponding driving style, drive type, and/or driver archetype. The association may be stored as rules internally in the route generation system (e.g., one or more memories) and/or in one or more databases (e.g., the driver profile database). For example, the data indicating the one or more conditions may be associated with a driver archetype assigned to a particular user, as stored in the driver profile database. For a user initiating the test drive request, the route generation may identify another user (e.g., via the user's driver identifier) having a same driver archetype as the requesting user. The route generation system may then identify the condition(s) associated with the other user's driver identifier, and apply those conditions for the requesting user.

A physical location having one or more features related to one or more of the conditions may be identified as a waypoint. For example, a physical location having a traffic light may be identified as a waypoint for a condition requiring a threshold number of traffic signals. For such a condition, the route generation system may identify a number of physical locations at which traffic signals are located within the geographic area that corresponds to the threshold number. Other road features for which a physical location may be identified as a waypoint may include, but are not limited to, potholes, stop signs, or the like. Additionally, or alternatively, two physical locations may be identified as waypoints if they define a route segment that includes one or more features related to one or more conditions. For example, if a route segment defined by two physical locations has a speed limit of 45 mph, and the condition related to the driving data and/or driver archetype is that the vehicle speed is below 50 mph (e.g., indicative of city driving and/or a "Cautious" driver archetype), then the two physical locations may be identified as waypoints.

In some implementations, the route generation system may identify relevant physical locations (e.g., related to particular conditions) by identifying, in the map data, a tag or other form of metadata including a relevant key term (e.g., "traffic light," "stop sign," "construction," "pothole," "speed limit," "hazard," "elevation," or the like). Additionally, when the key term is associated with a particular value (e.g., for speed limit or elevation), the route generation system may read or otherwise identify the value to identify the physical locations satisfying the particular conditions. Additionally, or alternatively, the route generation system may identify physical locations as waypoints based on one or more public records (e.g., as obtained from a public server and/or database) regarding a particular roadway. For example, the route generation system may obtain information from such public records of when a road was paved. If the information indicates that the roadway was paved within a threshold number of years (e.g., within the past 2 years), then the route generation system may identify two physical locations in and/or defining the roadway as waypoints satisfying the condition of a smooth roadway. Additionally, or alternatively, the route generation system may identify physical locations previously identified as waypoints, for example, as stored in one or more databases as part of a drive route (e.g., a previous test drive route), as described in more detail below.

Incorporating waypoints into a particular drive route may be less computationally and logistically complex than determining routes for separate trips, such as a first trip from the starting location to the waypoint and back to the starting location, and a second trip at a different time from the starting location to the ending location and back to the starting location. As a result, using waypoints may conserve computing resources (e.g., memory resources, processing resources, and/or battery power) of the route generation system and/or the vehicle navigation system (e.g., the on-board computer, user device, and/or the third party device), may reduce wear and tear on the test drive vehicle used, and may conserve energy needed to fuel the test drive vehicle.

As shown by reference number 124, the route generation system may obtain a test drive route starting and ending at the location of the third party entity and including the plurality of waypoints as intermediate locations. In some implementations, the route generation system may generate the test drive route (e.g., in implementations in which the route generation system has an integrated navigation system). Alternatively, the route generation system may transmit, to a remote navigation system (e.g., a third party navigation system), data indicating the starting and ending locations at the location of the third party entity and including the plurality of waypoints as intermediate locations. The route generation system may then receive data corresponding to the test drive route, as generated by the remote navigation system. As shown by reference number 126, the route generation system may transmit data indicating the generated test drive route to the user device, an on-board computer of a test drive vehicle, and/or a third party device (e.g., a device of an agent of the third party), where the test drive route may be displayed for the user.

In some implementations, the route generation system may use a supervised machine learning model to obtain the test drive route. For example, the machine learning model may be a supervised machine learning model trained based on the driving data and the location of the third party entity. Additionally, or alternatively, the route generation system may use an unsupervised machine learning model based on one or more clusters of users that have similar driving patterns and/or that are located in a similar geographic area.

In some implementations, the route generation system may store the test drive route in a database (e.g., the driver profile database or the third party entity database). The route generation system may associate the test drive route, in the database, with a third party identifier associated with the third party, a driver identifier associated with the user, and/or the driver archetype. As such, the route generation system may access the test drive route and/or one or more waypoints in the test drive route for a future user (e.g., a user having a same driver archetype associated with the test drive route and/or requesting a test drive route at the same third party entity), thereby conserving computing resources that would otherwise be used to re-generate the route or generate a new route.

Figure 1C:
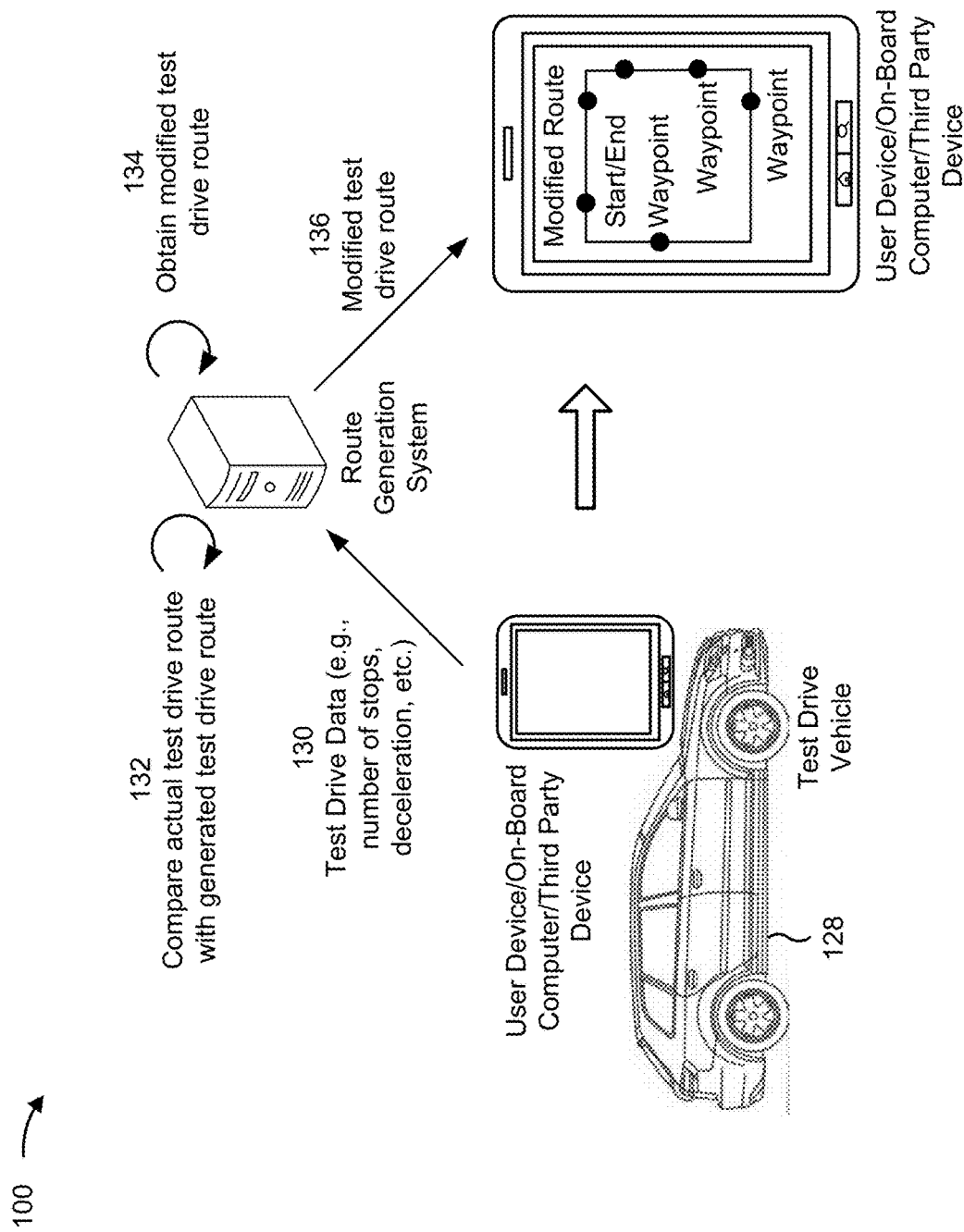

As shown in FIG. 1C, the route generation system may determine if the actual test drive route (e.g., the route being driven by the driver on the test drive) differs from the generated test drive route. In some implementations, the route generation system may receive test drive data obtained during the test drive of the test drive vehicle. The route generation system may receive the test drive data from an on-board computer of the test drive vehicle, the user device, and/or the third party device. For example, as shown by reference number 128, the on-board computer, the user device, and/or the third party device may measure and/or determine vehicle performance measurements of the test drive vehicle (e.g., a speed of the test drive vehicle, an acceleration of the test drive vehicle from a standstill position of the vehicle, a deceleration of the test drive vehicle to a standstill position, a vertical displacement of a body of the test drive vehicle, centripetal force, centrifugal force, a number of times the test drive vehicle is in the standstill position within a set period of time, a number of turns the test drive vehicle makes within the set period of time, etc.) in a similar manner as described above in connection with FIG. 1A and reference number 106.

As shown by reference number 130, the route generation system may receive the test drive data (e.g., from the vehicle on-board computer, the user device, and/or the third party device). In some implementations, the route generation system may receive the test drive data after the test drive has been completed (e.g., as post-processing and/or post-analysis). Alternatively, the route generation system may receive the test drive data in real-time as the test drive is in progress (e.g., transmit blocks of data in set intervals of time).

As shown by reference number 132, the route generation system may compare the test drive data with the driving data of the user and/or the data indicating the test drive route to determine if the actual test drive route (e.g., the route actually driven by the user during the test drive) satisfies a threshold number of conditions and/or whether or not the actual test drive route deviated from the generated test drive route by a threshold amount. For example, if the test drive vehicle is supposed to experience a threshold number of times that the test drive vehicle is at a standstill, but during the actual test drive experiences less than the threshold number, then the condition has not been satisfied. As another example, if the test drive route is supposed to include highway driving, but the test drive data indicates that the test drive vehicle did not experience a speed at or within a threshold distance (e.g., 5 mph) of a value indicative of highway driving (e.g., 70 mph), or did not drive along a stretch of roadway identified as a highway, then the route generation system may determine that the test drive vehicle did not experience highway driving and therefore, that the condition has not been satisfied. As another example, the route generation system may determine that the actual test drive route did not include a particular road feature, such as a pothole (e.g., the vehicle navigation system did not identify a pothole along the actual test drive route) and/or the test drive vehicle did not experience the particular road feature (e.g., as may be determined by a sensor in connection with the suspension system of the test drive vehicle). As another example, the route generation system may determine that the test drive vehicle deviated from the generated test drive route (e.g., went off course) by at least the threshold amount if the test drive vehicle deviated by a threshold distance (e.g., 2 miles, 5, miles, etc.) or by a threshold percentage of the total distance of the test drive route (e.g., 5%, 10%, 20%, etc.).

If the actual test drive route satisfies the threshold number and/or does not deviate from the generated test drive route by the threshold amount, then the route generation system may determine that the test drive route is satisfactory. As shown by reference number 134, if the actual test drive route fails to satisfy the threshold number of conditions and/or does deviate from the generated test drive route by at least the threshold amount, then the route generation system may determine that the test drive route was unsatisfactory, and therefore, may modify the test drive route.

The route generation system may modify the test drive route after the test drive has been completed (e.g., in implementations in which the route generation system receives the test drive data after the test drive has been completed), for example, for future test drives by users having a same driver archetype as the user experiencing the test drive. Alternatively, the route generation system may modify the test drive route in real-time (e.g., while the test drive is still in progress). To modify the test drive route, the route generation system may determine what is needed to satisfy the un-satisfied condition (e.g., 2 more complete standstills, highway driving for a threshold duration, etc.). The route generation system may then identify one or more physical locations as waypoints (e.g., in a similar manner as described above in connection with reference number 124) that satisfy the conditions (e.g., 2 or more traffic lights at which the test drive vehicle would be at a standstill, a roadway having a speed limit about 65 mph, etc.). When the test drive is still in progress, the route generation system may identify physical locations as waypoints that are between the current location of the test drive vehicle (e.g., based on data indicating the geographic location of the test drive vehicle received from the on-board computer, the user device, and/or the third party device) and the ending location (e.g., the location of the third party entity). As shown by reference number 136, the route generation system may transmit the modified test drive route to the on-board computer of the test drive vehicle, the user device, and/or the third party device.

In implementations in which the test drive route is determined using a machine learning model, the route generation system may retrain the machine learning model indicating that the test drive route satisfied less than a threshold number of the one or more conditions or that the test drive deviated from the test drive route by a threshold amount. For example, the machine learning model may process the route segments driven by the user that deviated from the generated test drive route and/or the waypoints that were added to satisfy the conditions. The machine learning model may then determine for future test drive routes (e.g., associated with the particular third party entity or other third party entities) that test drive routes needed to satisfy certain conditions may need additional requirements (e.g., a condition requiring 5 standstills may need a minimum of 8 traffic lights).

Figure 1D:
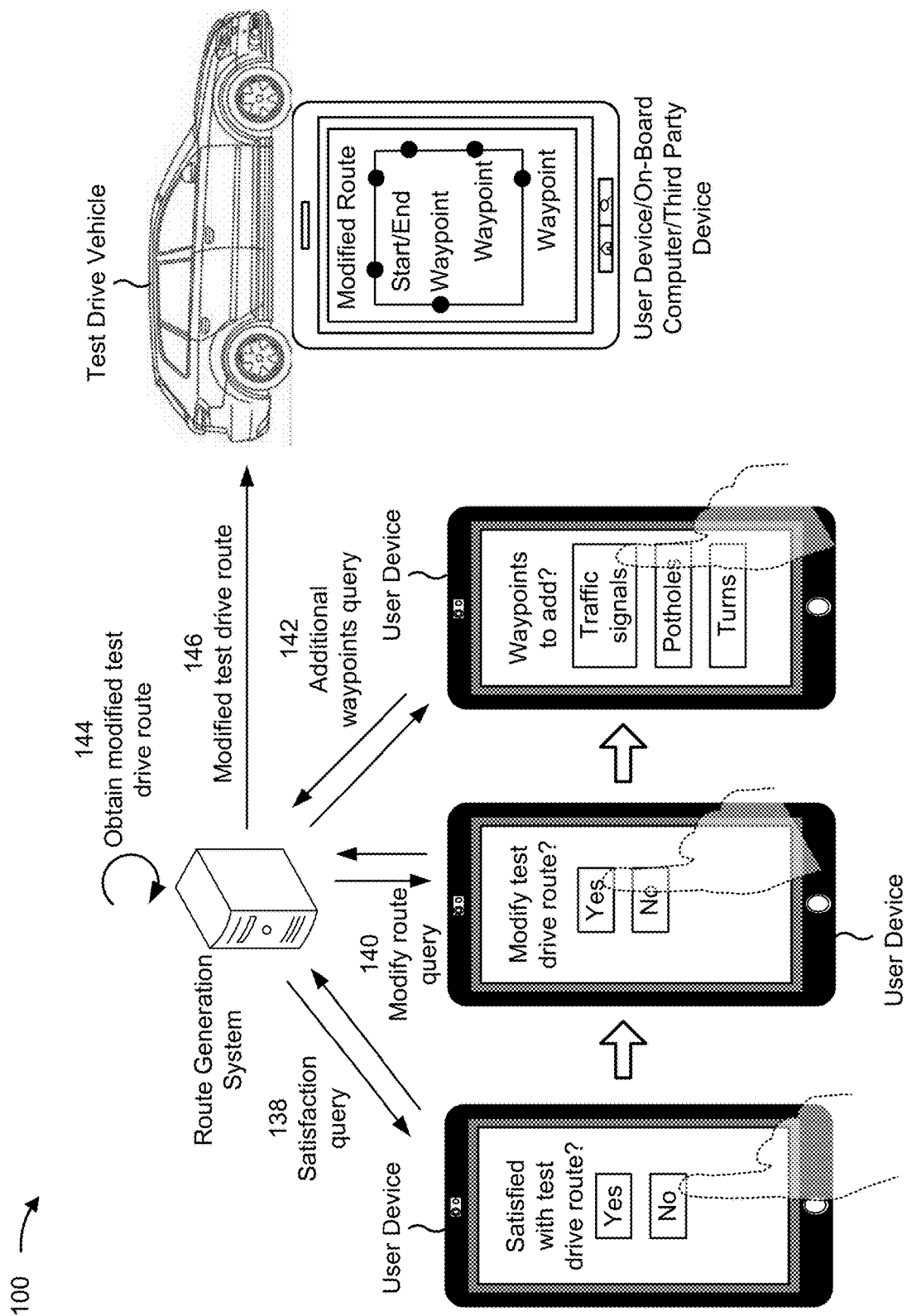

As shown in FIG. 1D, the route generation system may obtain user feedback regarding the test drive route. For example, as shown by reference number 138, the route generation system may transmit data corresponding to a satisfaction query (e.g., one or more queries) to the user device. The user may input the response to the query (e.g., one or more inputs), for example, by pressing a button on a designated space on the display of the user device. The route generation system may then receive data corresponding to the user's response.

If the data corresponding to the user's response indicates dissatisfaction with the test drive route, as shown by reference number 140, then the route generation system may transmit data corresponding to another query of whether or not the user wants to modify the test drive route. The user may input the response to the query, for example, by pressing a button on a designated space on the display of the user device. The route generation system may then receive data corresponding to the user's response.

If the data corresponding to the user's response indicates a desire to modify the test drive route, as shown by reference number 142, then the route generation system may transmit data corresponding to another query requesting one or more types of waypoints the user wants to add (e.g., more traffic signals, potholes, turns, etc.). The user may input the response to the query, for example, by pressing one or more buttons on designated spaces on the display of the user device. The route generation system may then receive data corresponding to the user's response.

The queries may be provided after the test drive has been completed. Alternatively, the queries may be provided at one or more set intervals while the test drive is in progress (e.g., halfway through the test drive route). As shown by reference number 144, if the received data responding to the queries indicates the user's dissatisfaction with the test drive route, then the route generation system may modify (e.g., update) the test drive route (e.g., in a similar manner as described above in connection with reference number 134). For example, if the test drive is in progress, the route generation system may identify waypoints corresponding to the desired waypoints selected by the user that are between the current location of the test drive vehicle and the ending location of the test drive route (e.g., the location of the third party entity). As shown by reference number 146, the route generation system may transmit the modified test drive route to the on-board computer of the test drive vehicle, the user device, and/or the third party device.

Figure 1E:
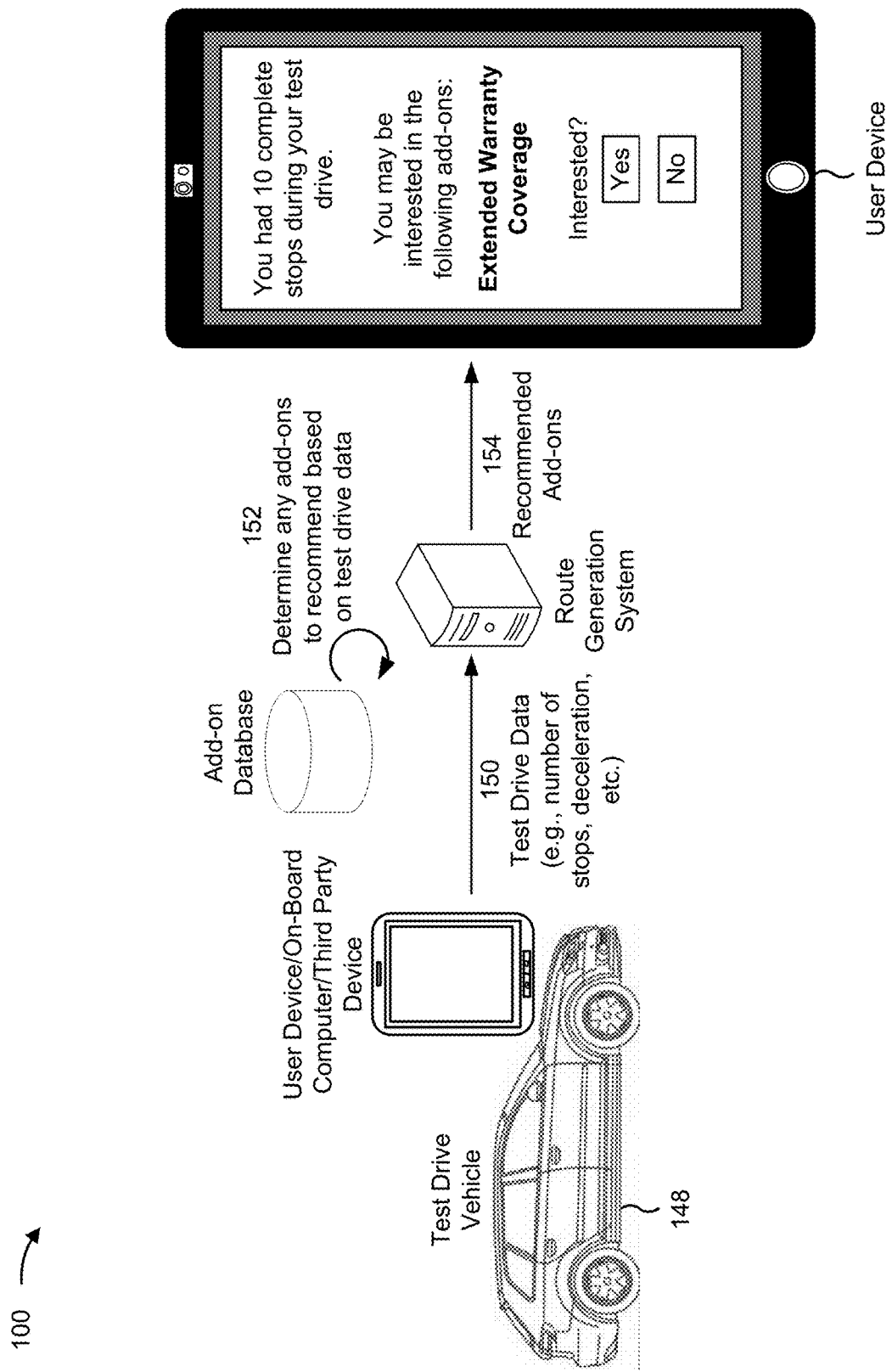

As shown in FIG. 1E, the route generation system may recommend one or more add-ons (e.g., vehicle products and/or services to add to a purchase of the vehicle) related to the driving behavior of the driver and/or normal intended route. In some implementations, the route generation system may determine the add-ons based on driving data accumulated during the actual test drive (e.g., test drive data). For example, as shown by reference number 148, the on-board computer of the test drive vehicle may include or communicate with a navigation system that may track and/or measure vehicle performance measurements of the test drive vehicle (e.g., a speed of the test drive vehicle, an acceleration of the test drive vehicle from a standstill position of the vehicle, a deceleration of the test drive vehicle to a standstill position, a vertical displacement of a body of the test drive vehicle, centripetal force, centrifugal force, a number of times the test drive vehicle is in the standstill position within a set period of time, a number of turns the test drive vehicle makes within the set period of time, etc.).

As shown by reference number 150, the route generation system may receive the test drive data from the on-board computer (and/or the user device and/or the third party device). For example, the vehicle on-board computer may transmit the data after the test drive has been completed. Alternatively, the vehicle on-board computer may transmit the data in real-time as the route is in progress (e.g., transmit blocks of data in set intervals of time).

As shown by reference number 152, the route generation system may determine if any add-ons should be recommended to the user based on one or more add-on conditions related to the test drive data. For example, one add-on condition may be that the vehicle is in a standstill position for a threshold number of times within a set period of time. This add-on condition indicates heavy stop-and-go driving, which would relate to a recommended add-on of extended warranty coverage. As another example, the add-on condition may be that the deceleration of the vehicle satisfies a threshold value. This add-on condition indicates heavy braking, and therefore wear on the brakes, which would relate to a recommended add-on of a brake warranty. As another example, the add-on condition may be a vertical displacement of a body of the vehicle satisfies a threshold distance for a number of times within a set period of time. This add-on condition indicates rough terrain, which would relate to a recommended add-on of a tire warranty or suspension warranty. As shown by reference number 154, the route generation system may transmit data indicating the recommended add-on(s) to the on-board computer of the test drive vehicle, the user device, and/or the third party device.

As explained above, test drive routes may be tailored to a particular user's typical operation of the vehicle. Such tailored test drive routes may be generated based on the user's driving pattern (e.g., the driving behavior of the user, typical driving conditions experienced by the user, etc.). By using a driving pattern associated with a particular user to generate a test drive route, the route generation system is capable of generating a test drive route that is representative of the intended operation of a vehicle by the user, and is more efficient and accurate than a person (e.g., the user or dealership agent) creating a custom route for each test drive based on preferences of the particular consumer. Additionally, the accuracy of the test drive route in representing the consumer's intended operation of the vehicle, and further incorporating waypoints into the test drive route may conserve computing resources (e.g., memory resources, processing resources, and/or battery power) of the route generation system. In addition, the route generation system being able to automatically update the test drive route while the test drive is in progress provides greater safety than the user modifying the route to try and find conditions more representative of the user's typical drive and intended operation of the vehicle. Furthermore, by associating similar driving patterns of users, the system is able to more efficiently generate and provide a test drive route for a particular user.

As indicated above, FIGS. 1A-1E are provided as an example. Other examples may differ from what is described with regard to FIGS. 1A-1E.

Figure 2:
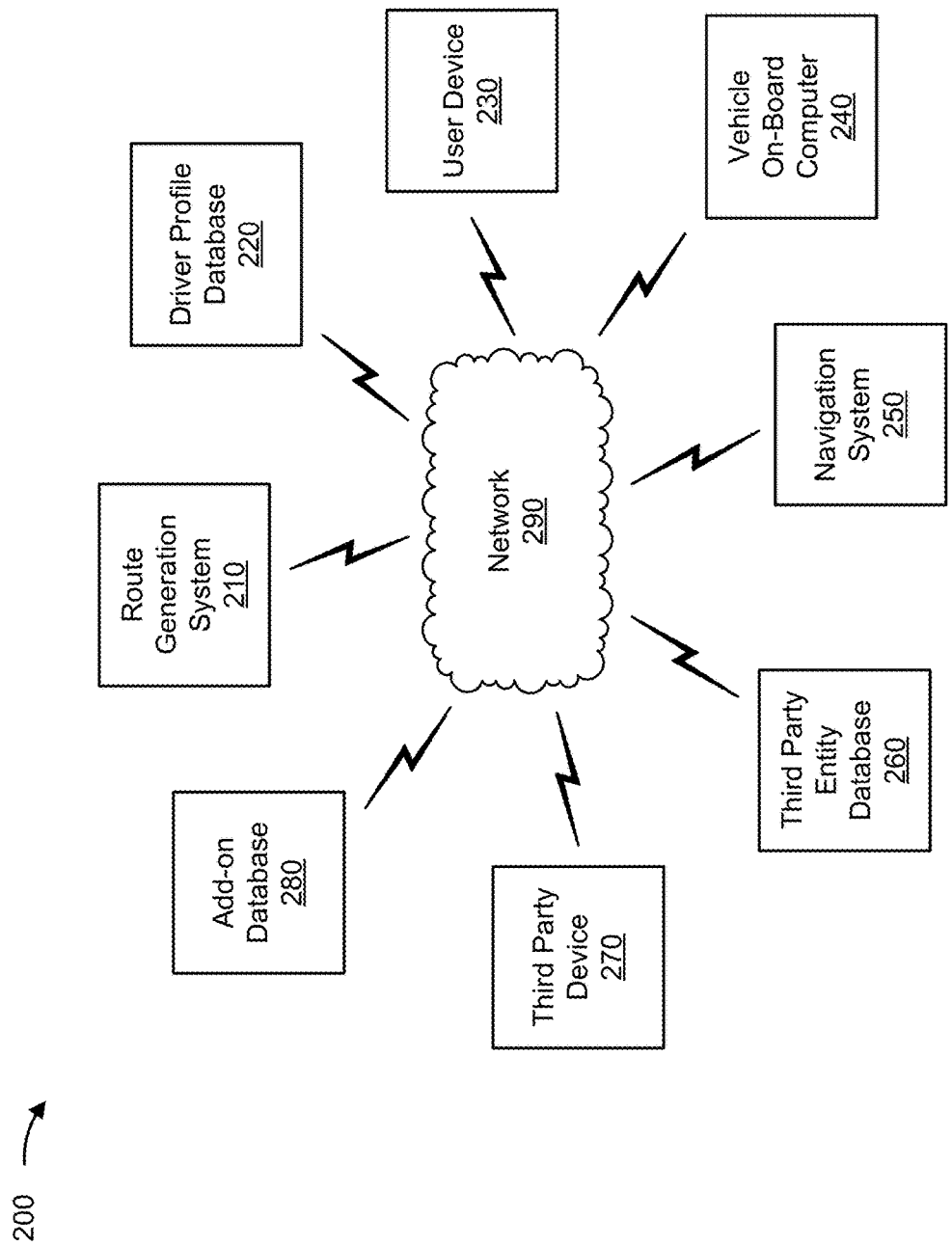
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a route generation system 210, a driver profile database 220, a user device 230, a vehicle on-board computer 240, a navigation system 250, a third party entity database 260, a third party device 270, an add-on database 280, and a network 290. Devices of environment 200 may interconnect via wired connections, wireless connections, or a combination of wired and wireless connections.

The route generation system 210 includes one or more devices capable of receiving, generating, storing, processing, providing, and/or routing information associated with generating a test drive route, as described elsewhere herein. The route generation system 210 may include a communication device and/or a computing device. For example, the route generation system 210 may include a server, such as an application server, a client server, a web server, a database server, a host server, or a server in a cloud computing system. In some implementations, the route generation system 210 includes computing hardware used in a cloud computing environment.

The driver profile database 220 includes one or more devices capable of receiving, generating, storing, processing, and/or providing information associated with generating a test drive route, as described elsewhere herein. The driver profile database 220 may include a communication device and/or a computing device. For example, the driver profile database 220 may include a data structure, a database, a data source, a server, a database server, an application server, a client server, a web server, a host server, a virtual server (e.g., executing on computing hardware), a server in a cloud computing system, a device that includes computing hardware used in a cloud computing environment, or a similar type of device. As an example, the driver profile database 220 may store account information, including an account identifier, of one or more drivers. The account information may include driving data for each driver, such as data indicating driving metrics measured during vehicle operation, driving style of the user, drive type of a typical route on which the user drives the vehicle, and/or road features of the typical route. The account information may also include the driver's contact information and/or geographic location (e.g., address, zip code, and/or geographic coordinates).

The user device 230 includes one or more devices capable of receiving, generating, storing, processing, and/or providing information associated with generating a test drive route, as described elsewhere herein. The user device 230 may include a communication device and/or a computing device. For example, the user device 230 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The vehicle on-board computer 240 may include one or more communication components (e.g., one or more wireless communication components and/or one or more wired communication components) to communicate with one or more other devices of FIG. 2. For example, the vehicle on-board computer 240 may include a wireless wide area network communication component to communicate with a radio access network to communicate with the route generation system 210 and/or the user device 230. As another example, the vehicle on-board computer 240 may include a local area network communication component (e.g., a WiFi communication component), a personal area network communication component (e.g., a Bluetooth communication component), and/or a wired communication component (e.g., a Universal Serial Bus communication component and/or a car area network communication component) to communicate with the user device 230.

The vehicle on-board computer 240 may also include or communicate with a vehicle navigation system that includes one or more devices capable of determining and/or outputting route information for navigating a route, as described elsewhere herein. For example, the vehicle navigation system may include a GNSS device, a GPS device, or the like. Additionally, or alternatively, the vehicle navigation system may be integrated into the user device 230.

The navigation system 250 includes one or more devices capable of receiving, generating, storing, processing, providing, and/or routing information associated with generating a test drive route, as described elsewhere herein. The navigation system 250 may include a communication device and/or a computing device. For example, the navigation system 250 may include a server, such as an application server, a client server, a web server, a database server, a host server, or a server in a cloud computing system. In some implementations, the navigation system 250 includes computing hardware used in a cloud computing environment. The navigation system 250 may include a database storing map data. The navigation system 250 may be integrated in the route generation system. Alternatively, the navigation system 250 may be hosted and/or operated by a third party.

The third party entity database 260 includes one or more devices capable of receiving, generating, storing, processing, and/or providing information associated with generating a test drive route, as described elsewhere herein. The third party entity database 260 may include a communication device and/or a computing device. For example, the third party entity database 260 may include a data structure, a database, a data source, a server, a database server, an application server, a client server, a web server, a host server, a virtual server (e.g., executing on computing hardware), a server in a cloud computing system, a device that includes computing hardware used in a cloud computing environment, or a similar type of device. As an example, the third party entity database 260 may store third party entity information, including a third party identifier, of one or more third party entities (e.g., a dealership). The third party entity information may include data corresponding to inventory of each third party entity (e.g., vehicle inventory). The third party entity information may also include the geographic location (e.g., address, zip code, and/or geographic coordinate) of each third party entity.

The third party device 270 includes one or more devices capable of receiving, generating, storing, processing, and/or providing information associated with generating a test drive route, as described elsewhere herein. The third party device 270 may include a communication device and/or a computing device. For example, the third party device 270 may include a wireless communication device, a user equipment, a laptop computer, a tablet computer, a desktop computer, or a similar type of device.

The add-on database 280 includes one or more devices capable of receiving, generating, storing, processing, and/or providing information associated with determining recommendations for vehicle add-ons, as described elsewhere herein. The add-on database 280 may include a communication device and/or a computing device. For example, the add-on database 280 may include a data structure, a database, a data source, a server, a database server, an application server, a client server, a web server, a host server, a virtual server (e.g., executing on computing hardware), a server in a cloud computing system, a device that includes computing hardware used in a cloud computing environment, or a similar type of device. As an example, the add-on database 280 may store data corresponding to a plurality of add-ons (e.g., extended warranty, tire warranty, brake warranty, suspension warranty, etc.) and conditions associated with the add-ons.

The network 290 includes one or more wired and/or wireless networks. For example, the network 290 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 290 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Additionally, or alternatively, a set of devices (e.g., one or more devices) of environment 200 may perform one or more functions described as being performed by another set of devices of environment 200.

Figure 3:
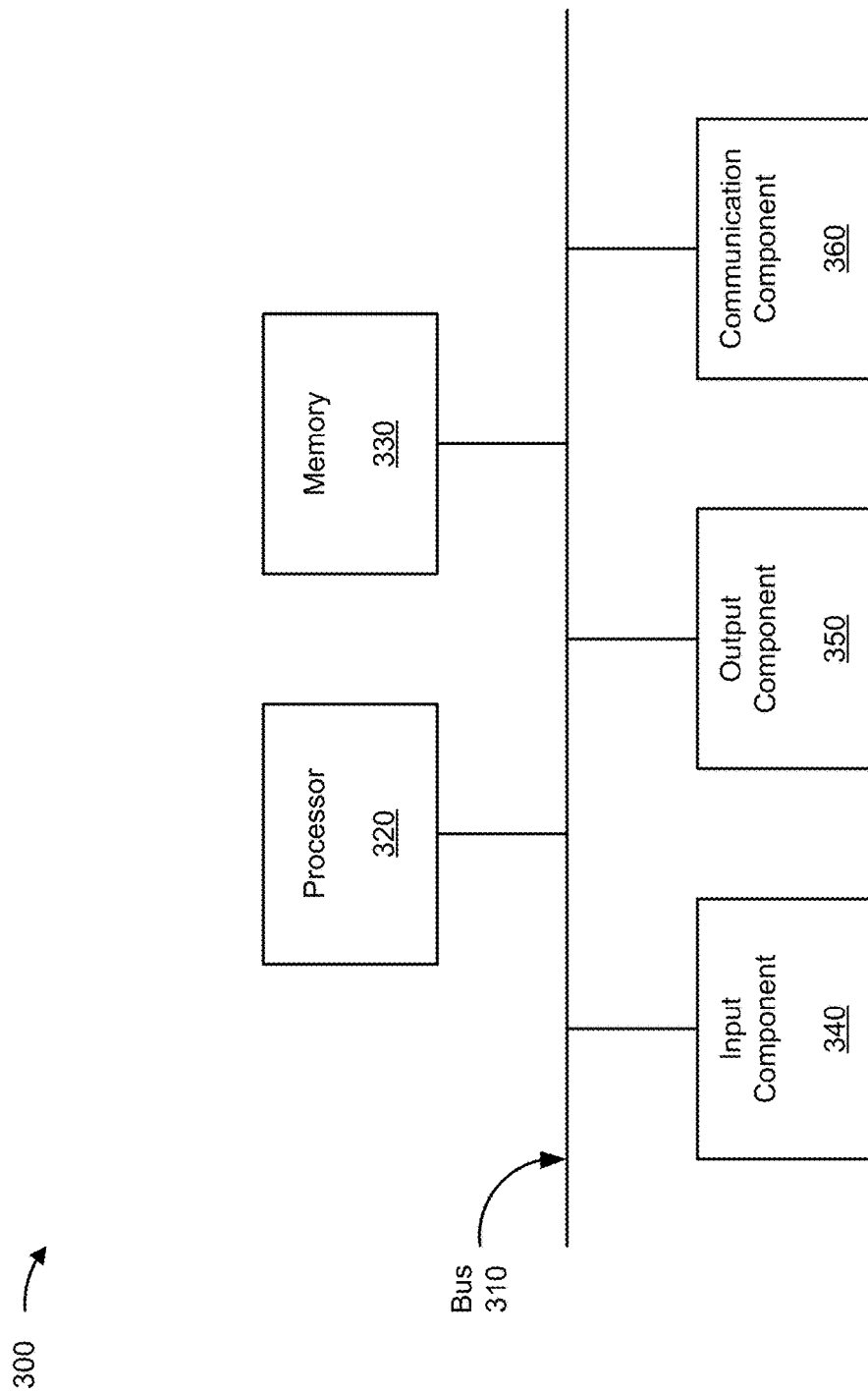
FIG. 3 is a diagram of example components of one or more devices of FIG. 2.

FIG. 3 is a diagram of example components of a device 300, which may correspond to the route generation system 210, the driver profile database 220, the user device 230, the vehicle on-board computer 240, the navigation system 250, the third party entity database 260, the third party device 270, and/or the add-on database 280. In some implementations, the route generation system 210, the driver profile database 220, the user device 230, the vehicle on-board computer 240, the navigation system 250, the third party entity database 260, the third party device 270, and/or the add-on database 280 include one or more devices 300 and/or one or more components of device 300. As shown in FIG. 3, device 300 may include a bus 310, a processor 320, a memory 330, an input component 340, an output component 350, and a communication component 360.

Bus 310 includes one or more components that enable wired and/or wireless communication among the components of device 300. Bus 310 may couple together two or more components of FIG. 3, such as via operative coupling, communicative coupling, electronic coupling, and/or electric coupling. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform one or more operations or processes described elsewhere herein.

Memory 330 includes volatile and/or nonvolatile memory. For example, memory 330 may include random access memory (RAM), read only memory (ROM), a hard disk drive, and/or another type of memory (e.g., a flash memory, a magnetic memory, and/or an optical memory). Memory 330 may include internal memory (e.g., RAM, ROM, or a hard disk drive) and/or removable memory (e.g., removable via a universal serial bus connection). Memory 330 may be a non-transitory computer-readable medium. Memory 330 stores information, instructions, and/or software (e.g., one or more software applications) related to the operation of device 300. In some implementations, memory 330 includes one or more memories that are coupled to one or more processors (e.g., processor 320), such as via bus 310.

Input component 340 enables device 300 to receive input, such as user input and/or sensed input. For example, input component 340 may include a touch screen, a keyboard, a keypad, a mouse, a button, a microphone, a switch, a sensor, a global positioning system sensor, an accelerometer, a gyroscope, and/or an actuator. Output component 350 enables device 300 to provide output, such as via a display, a speaker, and/or a light-emitting diode. Communication component 360 enables device 300 to communicate with other devices via a wired connection and/or a wireless connection. For example, communication component 360 may include a receiver, a transmitter, a transceiver, a modem, a network interface card, and/or an antenna.

Device 300 may perform one or more operations or processes described herein. For example, a non-transitory computer-readable medium (e.g., memory 330) may store a set of instructions (e.g., one or more instructions or code) for execution by processor 320. Processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry is used instead of or in combination with the instructions to perform one or more operations or processes described herein. Additionally, or alternatively, processor 320 may be configured to perform one or more operations or processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flowchart of an example process 400 associated with generating a test drive route. In some implementations, one or more process blocks of FIG. 4 may be performed by a system (e.g., route generation system 210). Additionally, or alternatively, one or more process blocks of FIG. 4 may be performed by one or more components of device 300, such as processor 320, memory 330, input component 340, output component 350, and/or communication component 360.

As shown in FIG. 4, process 400 may include receiving, from a computing device, driving data representative of a driving pattern of a user (block 410). The driving data may indicate at least one of: a portion of a route of a vehicle associated with the user during operation of the vehicle by the user, a performance measurement of the vehicle during operation of the vehicle by the user, a driving style of the user, a drive type of the portion of the route of the vehicle, or a road feature along the portion of the route of the vehicle during operation of the vehicle by the user. As further shown in FIG. 4, process 400 may include identifying a third party entity to facilitate a test drive by the user (block 420). As further shown in FIG. 4, process 400 may include identifying a geographic area within a threshold proximity of a location of the third party entity (block 430). As further shown in FIG. 4, process 400 may include identifying a plurality of waypoints within the geographic area, wherein one or more of the waypoints or one or more route segments defined by the waypoints satisfy one or more conditions based on the driving data (block 440). As further shown in FIG. 4, process 400 may include obtaining the test drive route starting and ending at the location of the third party entity and including the plurality of waypoints (block 450). As further shown in FIG. 4, process 400 may include transmitting data indicating the test drive route to at least one of a user device, an on-board computer of a test drive vehicle, or a third party device of the third party entity (block 460).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for generating a test drive route, the system comprising:
   one or more memories; and
   one or more processors, coupled to the one or more memories, configured to:
   receive, from a computing device via a network, driving data representative of a driving pattern of a user, wherein the driving data indicates at least one of:
   a portion of a route of a vehicle associated with the user during operation of the vehicle by the user,
   a performance measurement of the vehicle during operation of the vehicle by the user,
   a driving style of the user,
   a drive type of the portion of the route of the vehicle, or
   a road feature along the portion of the route of the vehicle during operation of the vehicle by the user;
   identify a third party entity to facilitate a test drive by the user;
   identify a geographic area within a threshold proximity of a location of the third party entity;
   identify a plurality of waypoints within the geographic area, wherein one or more of the waypoints or one or more route segments defined by the waypoints satisfy one or more conditions based on the driving data, and wherein the plurality of waypoints are obtained via the network and determined based at least in part on a public database record, the public database record storing information as to when a road segment associated with a waypoint, of the plurality of waypoints, was subject to maintenance;

obtain the test drive route starting and ending at the location of the third party entity and including the plurality of waypoints;

receive, based at least in part on the test drive route, test drive data while the test drive route is in progress and in accordance with one or more set intervals of time, from at least one of a user device, an on-board computer of a test drive vehicle, or a third party device;

modify, by the system, the test drive route during the test drive based at least in part on the test drive data; and transmit data via the network indicating the modified test drive route to at least one of the user device, the on-board computer of the test drive vehicle, or the third party device of the third party entity.

2. The system of claim 1, wherein the driving data is received based on input by the user on the computing device, wherein the input indicates at least one of the driving style of the user, the drive type of the portion of the route of the vehicle, or the road feature along the portion of the route of the vehicle during operation of the vehicle by the user.

3. The system of claim 1, wherein the computing device is the user device or the on-board computer.

4. The system of claim 1, wherein the performance measurement includes at least one of:
an acceleration of the vehicle from a standstill position of the vehicle;
a deceleration of the vehicle to a standstill position of the vehicle;
a speed of the vehicle;
a vertical displacement of a body of the vehicle;
a number of times the vehicle is in the standstill position within a set period of time; or
a number of turns the vehicle makes within the set period of time.

5. The system of claim 1, wherein the drive type includes at least one of highway driving, stop-and-go driving, residential driving, or commercial driving.

6. The system of claim 1, wherein the one or more processors, to identify the third party entity to facilitate the test drive, are configured to:
receive information that identifies a location of the user device or a desired test drive vehicle; and
identify, from a third party entity database, one or more third party entities each having a location within a threshold distance from the location of the user device and an inventory of vehicles that includes the desired test drive vehicle.

7. The system of claim 1, wherein the one or more conditions include at least one of:
a threshold number of traffic signals in the one or more route segments;
a threshold number of turns in the one or more route segments;
one or more construction zones in the one or more route segments;
one or more roadways, in the one or more route segments, having a speed limit above or below one or more threshold values;
one or more topographical features in or along the one or more route segments;
one or more hazardous road conditions associated with the one or more route segments; or
one or more roadways, in the one or more route segments, extending in a specified direction for a threshold distance.

8. The system of claim 1, wherein the one or more processors are further configured to:
store the driving data in a driver profile database under an account of the user, wherein the user is associated with a driver identifier in the driver profile database; and
associate the driving data with information that identifies a driver archetype associated with the user.

9. The system of claim 1, wherein the one or more processors are configured to use a supervised machine learning model to obtain the test drive route, wherein the supervised machine learning model is trained based on the driving data and the location of the third party entity.

10. The system of claim 9, wherein the one or more processors are further configured to:
compare the test drive data with at least one of the driving data or the data indicating the test drive route; and
retrain the supervised machine learning model if the test drive data indicates that the test drive route satisfied less than a threshold number of the one or more conditions or that the test drive deviated from the test drive route by a threshold amount.

11. The system of claim 1, wherein the one or more processors are configured to use an unsupervised machine learning model to obtain the test drive route, wherein the unsupervised machine learning model is based on one or more clusters of users that have similar driving patterns and are located in a similar geographic area.

12. A method of generating a test drive route, comprising:
receiving, by a system and from a computing device via a network, driving data corresponding to a driving pattern of a user;
identifying, by the system, a driver archetype based on the driving pattern of the user;
identifying, by the system, one or more conditions associated with the driver archetype;
identifying, by the system, a third party entity to facilitate a test drive by the user, wherein the third party entity has a location within a geographic area associated with the user;
identifying, by the system, a plurality of waypoints within a threshold distance from the location of the third party entity, wherein the plurality of waypoints or one or more route segments defined by the plurality of waypoints satisfy a threshold number of the one or more conditions, and wherein the plurality of waypoints are obtained via the network and determined based at least in part on a public database record, the public database record storing information as to when a road segment associated with a waypoint, of the plurality of waypoints, was subject to maintenance;
obtaining, by the system, the test drive route starting and ending at the location of the third party entity and including the plurality of waypoints;
outputting, by the system, data indicating the test drive route;
receiving, by the system as the test drive route is in progress and in accordance with one or more set intervals of time, test drive data from at least one of a user device, an on-board computer of a test drive vehicle, or a third party device;

modifying, by the system, the test drive route during the test drive based at least in part on the test drive data; and transmitting, by the system, the modified test drive route via the network to at least one of the user device, the on-board computer of the test drive vehicle, or the third party device.

13. The method of claim 12, further comprising:
storing the test drive route in a database; and
associating the test drive route, in the database, with at least one of:
 a third party identifier associated with the third party entity;
 a driver identifier associated with the user; or
 the driver archetype.

14. The method of claim 12, wherein identifying the one or more conditions comprises:
identifying a driver identifier associated with a driver having a same driver archetype as the user; and
identifying conditions associated with the driver identifier.

15. The method of claim 12, further comprising:
receiving test drive data obtained during the test drive from a test drive vehicle;
comparing the test drive data with at least one of the driving data or the data indicating the test drive route; and
wherein modifying the test drive route comprises:
 modifying the test drive route based on a determination that the test drive data indicates that the test drive route failed to satisfy the threshold number of the one or more conditions or that the test drive deviated from the test drive route by a threshold amount.

16. The method of claim 12, wherein modifying the test drive route comprises:
identifying one or more waypoints within the threshold distance from the location of the third party entity, wherein the one or more waypoints define one or more route segments satisfying a number of conditions to satisfy the threshold number; and
updating the test drive route to include the one or more waypoints prior to ending at the location of the third party entity.

17. A non-transitory computer-readable medium storing a set of instructions, the set of instructions comprising:
one or more instructions that, when executed by one or more processors of a device, cause the device to:
 receive driving data from a first vehicle via a personal area network, wherein the driving data corresponds to a driving pattern of a user;
 identify a third party entity to facilitate a test drive by the user;
 identify a geographic area within a threshold proximity of a location of the third party entity;
 identify one or more waypoints within the geographic area, wherein the one or more waypoints or one or more route segments defined by the one or more waypoints satisfy one or more conditions based on the driving data, and wherein the one or more waypoints are determined based at least in part on a public database record, the public database record storing information as to when a road segment associated with a waypoint, of the one or more waypoints, was subject to maintenance;
 transmit, to a navigation system, data corresponding to the location of the third party entity, as a start point of a test drive route and as an end point of the test drive route, and the one or more waypoints as one or more intermediate locations between the start point and the end point of the test drive route;
 receive, from the navigation system, the test drive route based on transmitting the data corresponding to the location of the third party entity and the one or more waypoints;
 transmit, to at least one of a user device, an on-board computer of a second vehicle, or a third party device of the third party entity, data via the personal area network indicating the test drive route; and
 receive, via an input component, data in accordance with one or more inputs obtained during the test drive of the second vehicle via an input component of the second vehicle.

18. The non-transitory computer-readable medium of claim 17, wherein the one or more instructions, when executed by the one or more processors, further cause the device to:
receive test drive data obtained during the test drive of the second vehicle; and
transmit, to at least one of the user device, the on-board computer of the second vehicle, or the third party device, data indicating one or more recommended add-ons based on a determination that the test drive data satisfies one or more add-on conditions.

19. The non-transitory computer-readable medium of claim 18, wherein the one or more add-on conditions include at least one of:
a number of times that the second vehicle is in a standstill position within a set period of time satisfies a threshold amount;
deceleration of the second vehicle satisfies a threshold value; or
vertical displacement of a body of the second vehicle satisfies a threshold distance for a number of times within a set period of time.

20. The non-transitory computer-readable medium of claim 17, wherein the one or more instructions, when executed by the one or more processors, further cause the device to:
transmit data corresponding to one or more queries requesting feedback about the test drive route;
receive the data corresponding to the one or more inputs in response to the one or more queries; and
wherein the one or more instructions, when executed by the one or more processors, to modify the test drive route, further cause the device to:
 modify the test drive route based on a determination that the one or more inputs indicate dissatisfaction with the test drive route.

* * * * *